United States Patent
Denoyer

(10) Patent No.: US 9,606,416 B2
(45) Date of Patent: *Mar. 28, 2017

(54) DIFFERENTIAL TWE MZM DRIVER FOR SILICON PHOTONICS

(71) Applicant: Finisar Corporation, Sunnyvale, CA (US)

(72) Inventor: Gilles P. Denoyer, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,334

(22) Filed: Mar. 11, 2016

(65) Prior Publication Data

US 2016/0195791 A1 Jul. 7, 2016

Related U.S. Application Data

(63) Continuation of application No. 14/863,275, filed on Sep. 23, 2015.
(Continued)

(51) Int. Cl.
*G02F 1/225* (2006.01)
*G02B 6/14* (2006.01)
(Continued)

(52) U.S. Cl.
CPC .............. *G02F 1/2255* (2013.01); *G02B 6/14* (2013.01); *G02F 1/2257* (2013.01);
(Continued)

(58) Field of Classification Search
CPC .................................................. G02F 1/2257
See application file for complete search history.

(56) References Cited

U.S. PATENT DOCUMENTS 5,138,480 A * 8/1992 Dolfi ..................... G02F 1/2255
359/251
7,095,543 B1 8/2006 Hill et al.
(Continued)

FOREIGN PATENT DOCUMENTS

EP 2 615 489 A1 7/2013

OTHER PUBLICATIONS

Denoyer et al., "Hybrid silicon photonic circuits and transceiver for 56Gb/s NRZ 2.2km transmission over single mode fiber", 2014 European Conference on Optical Communications (ECOC), Sep. 21, 2014, pp. 1-3 (3 pages).*
(Continued)

*Primary Examiner* — Omar R Rojas
(74) *Attorney, Agent, or Firm* — Maschoff Brennan

(57) ABSTRACT

A differential TWE MZM includes a differential driver, first and second capacitors, and first and second terminations. The differential driver includes a first differential output and a second differential output that collectively form a differential pair. The first differential output is DC coupled to a first arm optical phase shifter of a TWE MZM. The second differential output is DC coupled to a second arm optical phase shifter of the TWE MZM. The first capacitor AC couples the second differential output to the first arm optical phase shifter. The second capacitor AC couples the first differential output to the second arm optical phase shifter. The first and second terminations are coupled to, respectively, the first or second arm optical phase shifter.

20 Claims, 8 Drawing Sheets

Related U.S. Application Data

(60) Provisional application No. 62/054,281, filed on Sep. 23, 2014.

(51) Int. Cl.
 H04B 10/556 (2013.01)
 G02F 1/21 (2006.01)

(52) U.S. Cl.
 CPC ..... H04B 10/556 (2013.01); G02F 2001/212 (2013.01); G02F 2201/126 (2013.01)

(56) References Cited

U.S. PATENT DOCUMENTS

| | | | |
|---|---|---|---|
| 7,796,842 B2* | 9/2010 | Mosinskis | G02F 1/2255 327/361 |
| 2008/0089634 A1 | 4/2008 | Mosinskis et al. | |
| 2012/0328228 A1 | 12/2012 | Hara | |
| 2013/0343693 A1 | 12/2013 | Doerr | |

OTHER PUBLICATIONS

Narasimha, Adithyaram et al., "An Ultra Low Power CMOS Photonics Technology Platform for HS Optoelectronic Transceivers at less than $1 per Gbps," IEEE Proc. OFC/NOFC OMV4, 2010, 3 pgs.

Pinguet, T. et al., "25 Gb/s silicon photonic transceivers," IEEE Proc. GFP, Aug. 29-31, 2012, pp. 189-191.

Marris-Morini, D. et al., "A 40 Gbit/s optical link on a 300-mm silicon platform," Opt. Express 22, Mar. 24, 2014, 6 pgs.

Xiao, Xi et al., "High-speed, low-loss silicon Mach-Zehnder modulators with doping optimization," Opt. Express 21, Feb. 25, 2013, 10 pgs.

Streshinsky, Matthew et al., "Low power 50 Gb/s silicon traveling wave Mach-Zehnder modulator near 1300 nm," Optics Express, vol. 21, Issue 25, 2013, pp. 30350-30357.

Boeuf, F. et al., "A Multi-wavelength 3D-compatible Silicon Photonics Platform on 300mm SOI wafers for 25Gb/s Applications," IEEE, Electron Devices Meeting (IEDM), 2013, 4 pgs.

Joblot, S. et al., "Copper pillar interconnect capability for mmwave applications in 3D integration technology," Microelectronic Engineering, vol. 107, 2013, pp. 72-79.

Gill, D.M. et al., "A Figure of Merit Based Transmitter Link Penalty Calculation for CMOS-Compatible Plasma-Dispersion Electro-Optic Mach-Zehnder Modulators," IBM T.J. Watson Research Center, 2013, 6 pgs.

Baeyens et al., "A high-gain InP D-HBT driver amplifier with 50 GHz bandwidth and 10 Vpp differential output swing at 40 Gb/s", IEEE 25th Annual Technical Digest Gallium Arsenide Integrated Circuit (GaAs IC) Symposium, Nov. 9, 2013, pp. 153-156.

Kato et al., "10-Gb/s—80-km operation of full C-band InP MZ modulator with linear-accelerator-type tiny in-line centipede electrode structure directly driven by logic IC of 90-nm CMOS process", Optical Fiber Communication Conference/National Fiber Optic Engineers Conference 2011, Mar. 6, 2011, pp. 1-3.

International Search Report and Written Opinion of the International Searching Authority dated Nov. 26, 2015 as received in Application No. PCT/US2015/051790, 14 pgs.

\* cited by examiner

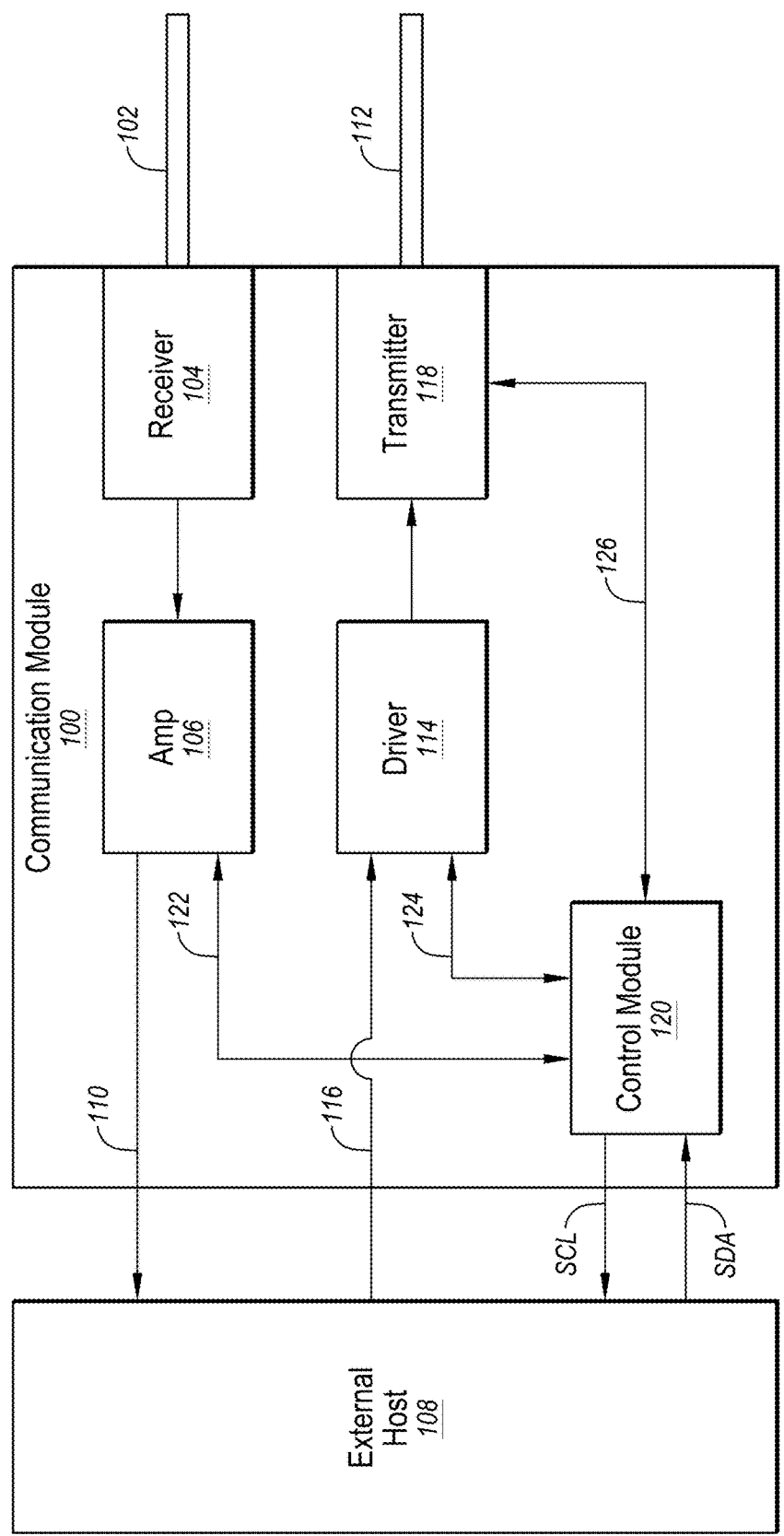

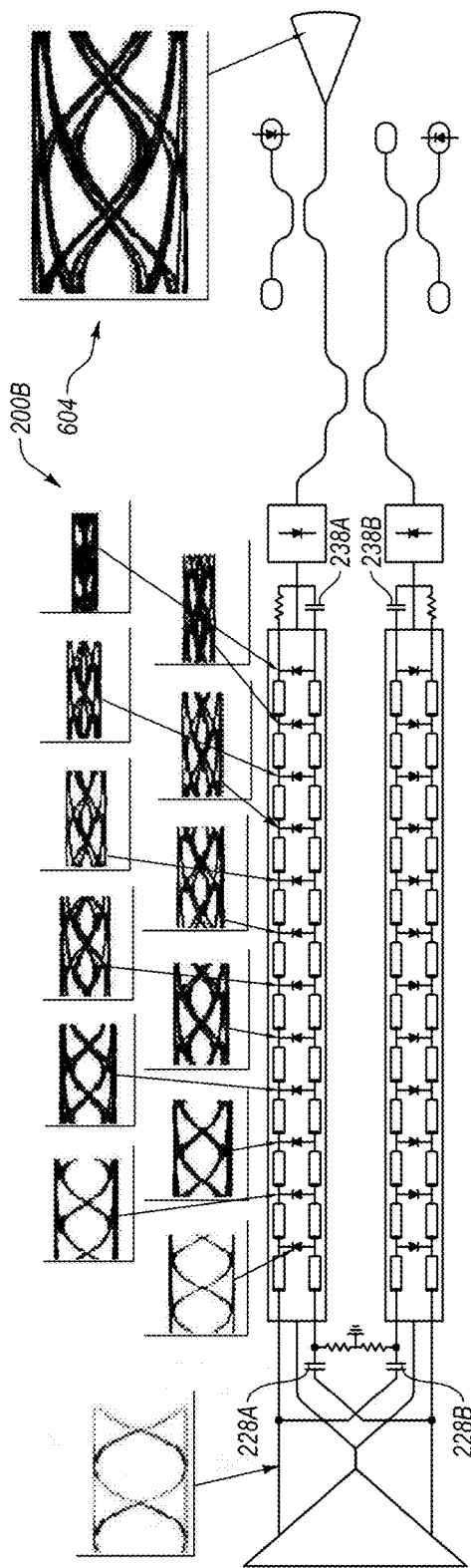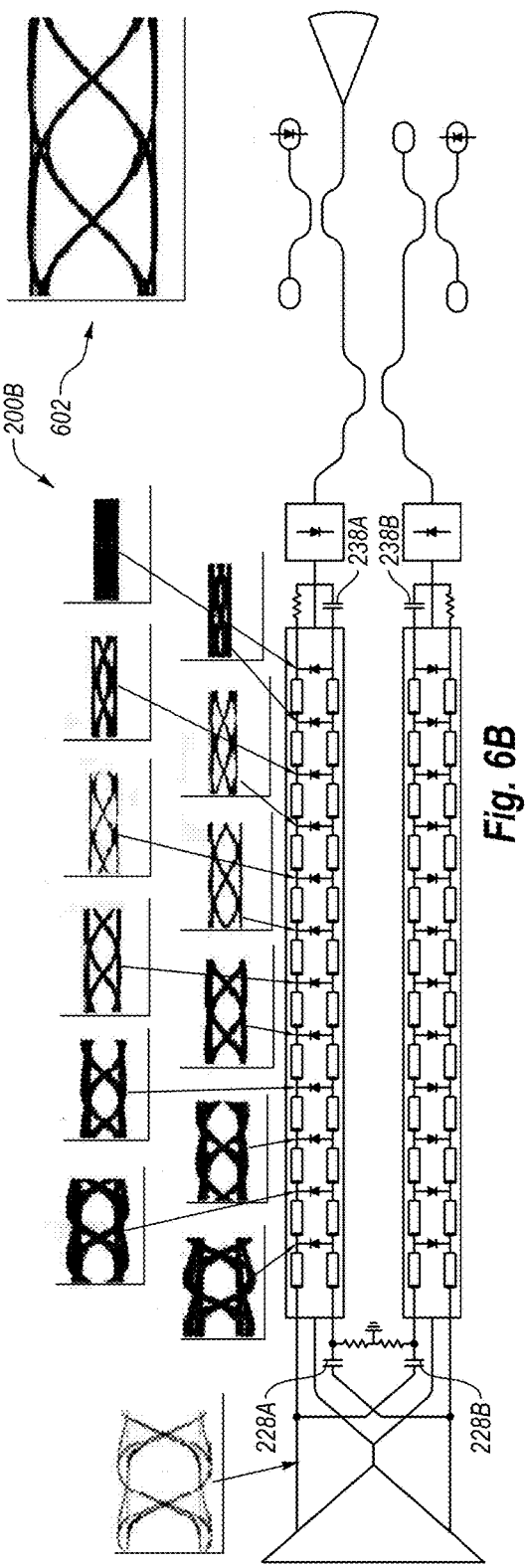
Fig. 6A
Fig. 6B

DIFFERENTIAL TWE MZM DRIVER FOR SILICON PHOTONICS

CROSS-REFERENCE TO RELATED APPLICATIONS

This application is a continuation of U.S. patent application Ser. No. 14/863,275, filed Sep. 23, 2015, which claims the benefit of and priority to U.S. Provisional Patent Application No. 62/054,281, filed Sep. 23, 2014, which is incorporated herein by reference.

FIELD

Some implementations discussed herein are related to a differential traveling wave electrode (TWE) mach-zehnder-modulator (MZM) driver for silicon photonics.

BACKGROUND

Unless otherwise indicated herein, the materials described herein are not prior art to the claims in the present application and are not admitted to be prior art by inclusion in this section.

Silicon optical devices (modulators, Germanium waveguide photodetectors) at 10/25/28 gigabits per second (Gbps) data rates have been demonstrated and have been introduced commercially. Progress towards achieving generation and detection of optical signals at rates larger than 50 Gbps have also been reported.

Ethernet and fibre channel have converged at 25.78 Gbps and 28 Gbps serial rates. While these data rates can be addressed with mature directly modulated III/V lasers (DML) (VCSEL/MMF and DFB/SMF) and meet current fiber optic link standards and customer requirements, it is not clear today that DML technologies will be able to quickly scale beyond 28 Gbps serial rate.

The subject matter claimed herein is not limited to implementations that solve any disadvantages or that operate only in environments such as those described above. Rather, this background is only provided to illustrate one example technology area where some implementations described herein may be practiced.

SUMMARY OF SOME EXAMPLE IMPLEMENTATIONS

Implementations disclosed herein relate to differential TWE MZM drivers for silicon photonics. Some embodiments described herein provide an AC coupled path from a driver to an electrode of each optical phase shifter in each arm of a TWE MZM, which in combination with a series RC termination may form a circuit topology that provides signal equalization and extends a bandwidth of the TWE MZM. The embodiments described herein may additionally include one or more bias resistors with resistance $R_B$ that provides a 0 volt (V) bias to the optical phase shifters. The bias may be ignored with respect to a transfer function of the TWE MZM when $C_B = C_{MZM} + C_T$ and $R_B \gg R_T$ as described in more detail below.

The TWE MZM may include TWEs that are lossy electrodes. Although the lossy nature of the electrodes may degrade electro-optical bandwidth of the TWE MZM, the lossy electrodes may offer increased immunity to transmission line reflections as compared to lossless or loss-minimized electrodes. As such, transmission line termination and source termination may not be as critical in the embodiments described herein as compared to TWE MZMs that include lossless or loss-minimized electrodes.

Some or all of the components of the TWE MZM may be integrated on-chip either on the driver of the TWE MZM or on a photonic integrated circuit (PIC) of the TWE MZM. The PIC may include various components of the TWE MZM, such as one or more waveguides, beam splitters, spot-size converters, combiners, or other photonic components. Modeling of such an integrated TWE MZM may be much easier than TWE MZMs with external components and such an integrated TWE MZM may have a much smaller footprint than TWE MZMs with external components.

In an example implementation, a differential TWE MZM driver includes a differential driver, first and second capacitors, and first and second terminations. The differential driver includes a first differential output and a second differential output that collectively form a differential pair. The first differential output is DC coupled to a first arm optical phase shifter of a TWE MZM. The second differential output is DC coupled to a second arm optical phase shifter of the TWE MZM. The first capacitor AC couples the second differential output to the first arm optical phase shifter. The second capacitor AC couples the first differential output to the second arm optical phase shifter. The first termination is coupled to the first arm optical phase shifter. The second termination is coupled to the second arm optical phase shifter.

In another example implementation, a TWE MZM includes an input waveguide, first and second arm optical waveguides, first and second arm optical phase shifters, and the above-described differential TWE MZM driver. The input waveguide is coupled to a continuous wave (CW) laser to receive a CW input beam. The first arm optical waveguide is coupled to receive a first portion of the CW input beam from the input waveguide. The second arm optical waveguide is coupled to receive a second portion of the CW input beam from the input waveguide. The first arm optical phase shifter is coupled to the first arm optical waveguide. The second arm optical phase shifter is coupled to the second arm optical waveguide. The differential TWE MZM includes the differential driver, the first and second capacitors, and the first and second terminations as already described.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description, which follows, and, in part, will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description will be rendered by reference to specific implementations thereof, which are illustrated in the appended drawings. It is appreciated that these drawings depict only typical implementations of the invention and are, therefore, not to be considered limiting of its scope. The invention will be described and explained with additional specificity and detail through the use of the accompanying drawings in which:

FIG. 1 illustrates an example communication module in which some embodiments described herein may be implemented;

FIGS. 6A and 6B illustrate the TWE MZM of FIG. 2B and various simulated eye diagrams;

DETAILED DESCRIPTION OF SOME EXAMPLE IMPLEMENTATIONS

Figure 2A:
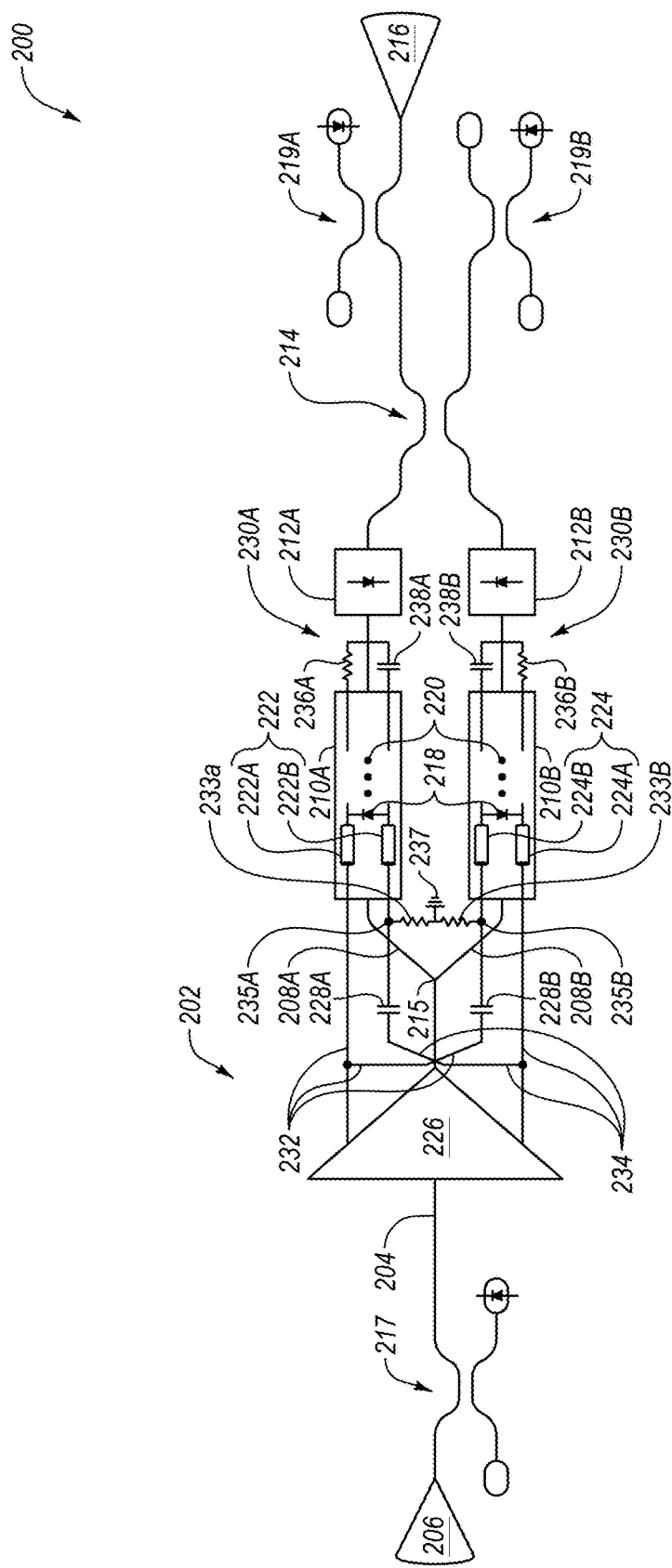
FIG. 2A illustrates an example TWE MZM that may be implemented in the communication module of FIG. 1.

Reference will now be made to the drawings to describe various aspects of example implementations of the invention. It is to be understood that the drawings are diagrammatic and schematic representations of such example implementations, and are not limiting of the present invention, nor are they necessarily drawn to scale.

FIG. 1 illustrates an example communication module 100 in which some embodiments described herein may be implemented, arranged in accordance with at least one embodiment described herein. While the communication module 100 will be described in some detail, the communication module 100 is described by way of illustration only, and not by way of restricting the scope of the described embodiments. The principles described herein may be suitable for 28 Gbps, 40 Gbps, 51 Gbps, 56 Gbps, and higher or lower bandwidth fiber optic links. As used herein, the terms "28 Gbps", "40 Gbps", "51 Gbps", and "56 Gbps" are rounded approximations of signaling rates and have the meanings commonly understood by those of ordinary skill in the art. In particular, the terms "28 Gbps", "40 Gbps", "51 Gbps", and "56 Gbps" refer to data rates substantially equal to 28 Gbps, 40 Gbps, 51 Gbps, and 56 Gbps, respectively.

Furthermore, the principles described herein may be implemented in communication modules of any form factor without restriction. In an example embodiment, the principles described herein are implemented in communication modules that are compliant with the C form-factor pluggable (CFP) multi-source agreement (MSA) and the IEEE 802.3ba 100GBASE-LR4 specification. Communication modules that comply with both of the foregoing may be referred to as CFP4 communication modules. In other embodiments, the communication modules in which the principles described herein are implemented may be compliant with the CFP MSA or other MSA or may not conform to any MSA at all.

In operation, the communication module 100 receives one or more optical signals from one or more optical fibers 102 using one or more optical receivers 104 ("Receiver" in FIG. 1). The optical receiver 104 transforms the optical signal into an electrical signal. The optical receiver 104 provides the resulting electrical signal to one or more amplifiers 106 ("Amp" in FIG. 1). The amplifier 106 amplifies the electrical signal and provides the amplified electrical signal to an external host 108 as indicated at 110. The external host 108 may be any computing system capable of communicating with the communication module 100.

The communication module 100 may also receive one or more electrical signals from the external host 108 for transmission onto one or more optical fibers 112. Specifically, one or more drivers 114 receive the electrical signal, as indicated at 116, and drive one or more optical transmitters 118 with signals that cause the optical transmitter 118 to emit onto the fiber 112 one or more optical signals representative of the information in the electrical signal provided by the external host 108. In an example embodiment described in more detail below, the driver 114 and the optical transmitter 118 may be implemented as a TWE MZM.

The behavior of the optical receiver 104, the amplifier 106, the driver 114, and the optical transmitter 118 may vary dynamically due to a number of factors. For example, temperature changes, power fluctuations, and feedback conditions may each affect the performance of these components. Accordingly, the communication module 100 may include a control module 120, which may evaluate temperature and voltage conditions and other operational circumstances, and receive information from the amplifier 106 (as indicated at 122) and from the driver 114 (as indicated at 124). This allows the control module 120 to optimize the dynamically varying performance, and additionally detect when there is a loss of signal.

Specifically, the control module 120 may counteract these changes by adjusting settings on the amplifier 106 and/or the driver 114 (as also indicated at 122 and/or 124). These settings adjustments may be intermittent since they may only be made when temperature or voltage or other low frequency changes so warrant. The control module 120 may communicate with the host 108 through a communication interface such as an I²C two-wire interface, indicated in FIG. 1 as serial data (SDA) and serial clock (SCL) lines. The control module 120 may alternatively or additionally receive information from the transmitter 118 and/or control a bias point (e.g., $\pi/2$ bias point) of the transmitter 118 (as indicated at 126).

FIG. 2A illustrates an example TWE MZM 200 that may be implemented in the communication module 100 of FIG. 1, arranged in accordance with at least one embodiment described herein. The TWE MZM 200 is an example of the driver 114 and the transmitter 118 of FIG. 1.

The TWE MZM generally includes a differential TWE MZM driver 202, an input waveguide 204 optically coupled to a continuous wave (CW) laser (not shown)—e.g., through an input spot size converter 206, first and second arm optical waveguides 208A and 208B (collectively "optical waveguides 208"), first and second arm TWEs 210A and 210B (collectively "TWEs 210"), first and second arm static quadrature phase biasing phase shifters 212A and 212 (collectively "static quadrature phase biasing phase shifters 212"), a combiner 214, and an output spot size converter 216. In the specification and claims, ordinals such as first, second, third, etc. may be used to distinguish between otherwise similarly named components or elements. The use of ordinals does not indicate an order or preference with respect to the components or elements unless context dictates otherwise.

The input and output spot size converters 206 and 216 may each include a grating coupler or other suitable spot size converter. The combiner 214 may include a directional coupler, a 2×2 multi mode interference coupler (MMI), or other suitable combiner.

The input waveguide 204 receives, through the input spot size converter 206, a CW input beam from the CW laser. The first arm optical waveguide 208A is coupled to receive a first portion of the CW input beam from the input waveguide 204 using an optical beam splitter 215, such as a 3 decibel (dB) optical beam splitter (e.g., Y junction). The second arm optical waveguide 208B is coupled to receive a second portion of the CW input beam from the input waveguide 204 using the optical beam splitter 215. In some embodiments, each of the first portion and the second portion of the CW input beam includes about half of the optical power of the CW input beam.

Optionally, the TWE MZM 200 may further include a CW laser power monitor 217 to monitor a power of the CW laser. The CW laser power monitor 217 may include, e.g., a tap and a monitor photodiode.

The static quadrature phase biasing phase shifters 212 are coupled to the optical waveguides 208 after (e.g., downstream of) the TWEs 210. More particularly, the first arm static quadrature phase biasing phase shifter 212A is coupled to the first arm optical waveguide 208A after the first arm TWE 210A and the second arm static quadrature phase biasing phase shifter 212B is coupled to the second arm optical waveguide 208B after the second arm TWE 210B. Together, the static quadrature phase biasing phase shifters 212 bias the first and second portions of the CW input beam traveling in the optical waveguides 208 at a $\pi/2$ phase shift relative to each other, referred to as a $\pi/2$ bias or quadrature bias. The $\pi/2$ bias allows the TWE MZM driver 202 to impart an additional $\pi/2$ phase shift for destructive interference (e.g., $\pi/2$ bias plus $\pi/2$ additional phase shift=$\pi$ total phase shift) or an additional $-\pi/2$ phase shift for constructive interference (e.g., $\pi/2$ bias plus $-\pi/2$ additional phase shift=0 total phase shift).

In operation, the differential TWE MZM driver 202 applies a modulation signal to the TWEs 210 to modulate the phase difference between the first and second portions of the CW input beam traveling in the optical waveguides 208 in view of the phase bias provided by the static quadrature phase biasing phase shifters 212. The first and second portions of the CW input beam recombine at the combiner 214 where they undergo constructive and destructive interference depending on the net phase difference to encode data in amplitude of a resulting output signal that is eventually output through the output spot size converter 216 into, e.g., an optical fiber of an optical network. The TWE MZM 200 may additionally include one or more sensing taps and monitor photodiodes 219A, 219B to sense/measure one or more parameters of the output signal and set the MZM quadrature bias.

The TWEs 210 each include one or more optical phase shifters 218 coupled to a corresponding one of the optical waveguides 208. A single optical phase shifter 218 per TWE 210 is illustrated in FIG. 2A where ellipses 220 indicate that each TWE 210 may optionally include more than one optical phase shifter 218. In an example embodiment, each of the optical phase shifters 218 includes a carrier depletion reverse biased PN diode.

Each TWE 210 additionally includes a two-conductor transmission line 222 or 224 that may be segmented, e.g., into one or more first transmission line segments 222A or 224A and one or more second transmission line segments 222B or 224B. The first transmission line segments 222A may be coupled in series with each other. The second transmission line segments 222B may be coupled in series with each other. The first transmission line segments 224A may be coupled in series with each other. The second transmission line segments 224B may be coupled in series with each other. When each TWE 210 includes more than one optical phase shifter 218, the optical phase shifters 218 of each TWE 210 may be coupled in parallel, e.g., with cathodes coupled to first transmission line segments 222A or 224A and anodes coupled to second transmission line segments 222B or 224B.

Each of the TWEs 210 includes one or more optical phase shifter sections. Each optical phase shifter section includes a corresponding one of the one or more first transmission line segments 222A or 224A, a corresponding one of the one or more second transmission line segments 222B or 224B, and a corresponding one of the one or more optical phase shifters 218. A cathode of the corresponding optical phase shifter 218 is coupled to the corresponding first transmission line segment 222A or 224A while an anode of the corresponding optical phase shifter 218 is coupled to the corresponding second transmission line segment 222B or 224B. FIG. 2A illustrates a total of two optical phase shifter sections, one each per TWE 210, although the TWE MZM 200 may include more than one optical phase shifter section per TWE 210.

The differential TWE MZM driver 202 is coupled to each of the optical phase shifters 218 as described in more detail below and includes a differential driver 226, a first capacitor 228A, a second capacitor 228B, a first termination 230A, and a second termination 230B.

The differential driver 226 includes a first differential output 232 and a second differential output 234 that collectively form a differential pair. The first differential output 232 is direct coupling (DC) coupled to a cathode of each optical phase shifter 218 of the first arm TWE 210A, e.g., through one or more of the first transmission line segments 222A. The first differential output 232 is also capacitively coupled, or AC coupled, to an anode of each optical phase shifter 218 of the second arm TWE 210B by the second capacitor 228B and through one or more of the second transmission line segments 222B. Analogously, the second differential output 234 is DC coupled to a cathode of each optical phase shifter 218 of the second arm TWE 210B, e.g., through one or more of the first transmission line segments 224A. The second differential output 234 is also AC coupled to an anode of each optical phase shifter 218 of the first arm TWE 210A by the first capacitor 228A and through one or more of the second transmission line segments 224B.

The TWE MZM driver 202 may further include a first bias resistor 233A and a second bias resistor 233B. The first bias resistor 233A is coupled between a first node 235A and ground 237 where the first node 235A is coupled between the first capacitor 228A and the anode of each optical phase shifter 218 of the first arm TWE 210A. Analogously, the second bias resistor 233B is coupled between a second node 235B and ground 237 where the second node 235B is coupled between the second capacitor 228B and the anode of each optical phase shifter 218 of the second arm TWE 210B.

The first termination 230A is coupled to the cathode and the anode of each optical phase shifter 218 of the first arm TWE 210A. The first termination 230A may include an RC termination. For example, the first termination 230A in FIG. 2A includes a first termination resistor 236A and a first termination capacitor 238A. The first termination resistor 236A is coupled to the cathode of each optical phase shifter 218 of the first arm TWE 210A and the first termination capacitor 238A is coupled between the first termination resistor 236A and the anode of each optical phase shifter 218 of the first arm TWE 210A.

Analogously, the second termination 230B is coupled to the cathode and the anode of each optical phase shifter 218 of the second arm TWE 210B. The second termination 230B may include an RC termination. For example, the second termination 230B in FIG. 2A includes a second termination resistor 236B and a second termination capacitor 238B. The second termination resistor 236B is coupled to the cathode of each optical phase shifter 218 of the second arm TWE 210B and the second termination capacitor 238B is coupled between the second termination resistor 236B and the anode of each optical phase shifter 218 of the second arm TWE 210B.

In an example embodiment, each of the first and second capacitors 228A and 228B may have a capacitance $C_B$ of 2.5 picofarads (pF) or other relatively small capacitance such that the first and second capacitors 228A and 228B are small enough to be integrated on-chip with the PIC or the differential driver 226, each of the first and second bias resistors 233A and 233B may have a resistance $R_B$ of 5 kiloOhms (kΩ) or other relatively small resistance such that the first and second bias resistors 233A and 233B are small enough to be integrated on-chip with the PIC or the differential driver 226, each of the first and second termination resistors 236A and 236B may have a resistance $R_T$ of 40 ohms (Ω) or other suitable resistance to provide radio frequency (RF) termination of each of the TWEs 210, and each of the first and second termination capacitors 238A and 238B may have a capacitance $C_T$ of 1.5 pF or other relatively small capacitance such that the first and second termination capacitors 238A and 238B are small enough to be integrated on-chip with the PIC or the differential driver 226. In other embodiments, one or more of the foregoing components may have different values than those specifically listed. Alternatively or additionally, one or more of the first capacitor 228A, the second capacitor 228B, the first termination resistor 236A, the second termination resistor 236B, the first termination capacitor 238A, and the second termination capacitor 238B may be integrated on chip with the differential driver 226 or with the PIC. The PIC may include one or more of the input waveguide 204, the optical waveguides 208, the combiner 214, the input and output spot size converters 206 and 216, and/or other photonic components.

Figure 2B:
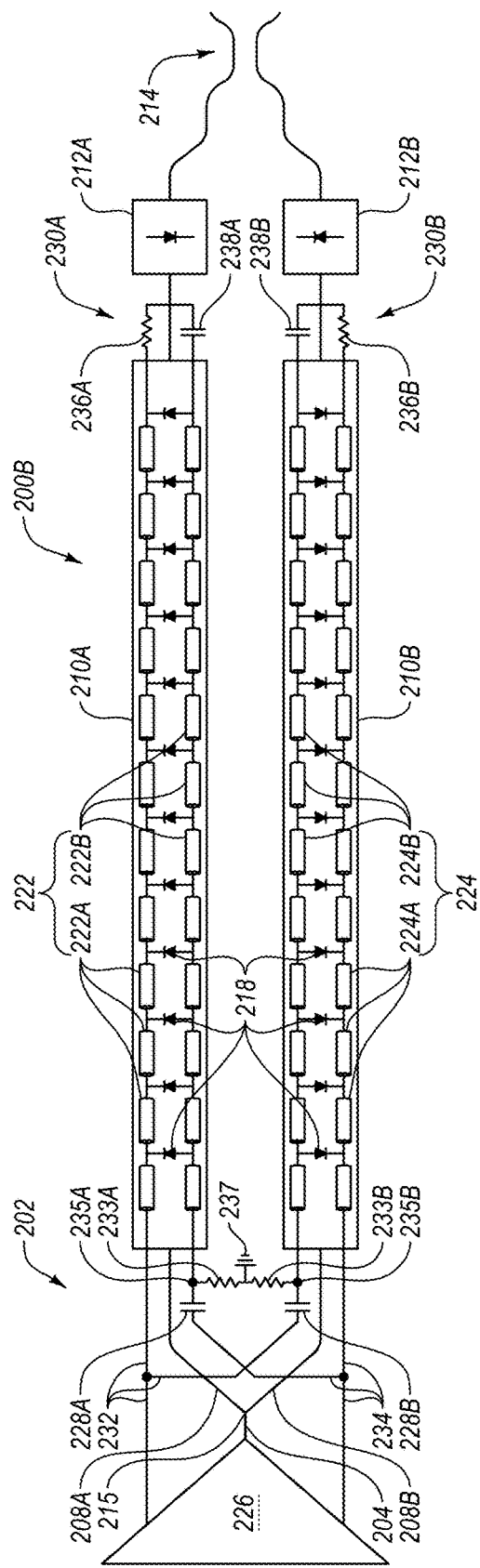
FIG. 2B illustrates an example embodiment of the TWE MZM of FIG. 2A.

FIG. 2B illustrates an example embodiment 200B of the TWE MZM 200 of FIG. 2A (hereinafter "TWE MZM 200B"), arranged in accordance with at least one embodiment described herein. Various components of FIG. 2A have been omitted from FIG. 2B for simplicity, including the input spot size converter 206, the output spot size converter 216, the CW laser power monitor 217, and the sensing taps and monitor photodiodes 219A, 219A. Although the foregoing components are not illustrated in FIG. 2B, they may be included in or coupled to the TWE MZM 200B of FIG. 2B. In FIG. 2B, only some of the optical phase shifters 218, first transmission line segments 222A and 224A, and second transmission line segments 222B are labeled for simplicity.

In the illustrated embodiment of FIG. 2B, each of the TWEs 210 includes twelve optical phase shifter sections such that in the first arm TWE 210A there are twelve first transmission lines sections 222A, twelve second transmission line sections 222B, and twelve optical phase shifters 218 and in the second arm TWE 210B there are twelve first transmission lines sections 224A, twelve second transmission line sections 224B, and twelve optical phase shifters 218. The first differential output 232 is DC coupled to a cathode of each of the optical phase shifters 218 of the first arm TWE 210A through one or more of the first transmission line sections 222A. The first differential output 232 is also AC coupled to an anode of each of the optical phase shifters 218 of the second arm TWE 210B by the second capacitor 228B and through one or more of the second transmission line sections 224B. The second differential output 234 is DC coupled to a cathode of each of the optical phase shifters 218 of the second arm TWE 210B through one or more of the first transmission line sections 224A. The second differential output 234 is also AC coupled to an anode of each of the optical phase shifters 218 of the first arm TWE 210A by the first capacitor 228A and through one or more of the second transmission line sections 222B. Each of the TWEs 210 may have a length of 3.36 millimeters (mm) in an example embodiment, or may be longer or shorter in other embodiments.

The TWE MZMs 200 and 200B of FIGS. 2A and 2B may exhibit a given phase shift under a given voltage drive condition and electrode length and given optical attenuation. For instance, the TWE MZM 200 or 200B of FIG. 2A or 2B may exhibit a 10.5 degree/millimeter (mm) phase shift under 2.5 volts (V) bias ($V_\pi \cdot 1=4$ V·centimeter (cm)) with an optical attenuation $\alpha_{optical}$ of 0.55 dB/mm. In an ideal case for the TWE MZM, MZM voltage to optical power transfer may be determined according to equation 1:

$$P_0(t) = \frac{P_i}{2}\left[1 + \cos\left(\frac{\Delta V(t)}{V_{\pi mzm}}\pi\right)\right]e^{-\alpha_{optical} \cdot L} \qquad (1)$$

In equation 1, $P_0$ is optical power output of the TWE MZM and t is a variable representing time. $P_i$ is optical power input of the TWE MZM. L is length of the TWE of the TWE MZM. $V_{\pi mzm}=(V_\pi \cdot 1)/L$, where $V_\pi \cdot 1$ is the voltage to achieve an optical phase shift of it between the two arms of the TWE MZM. e is Euler's number, e.g., about 2.71828. The ideal case assumes a lumped electrodes model with lossless TWEs and an ideal match of RF to optical wave. Optical modulation amplitude (OMA) as a function of L may be determined from equation 1. In the instant example, maximum OMA may be achieved at π/2 bias point for L=7 mm.

The lumped electrodes model may not be valid for long electrodes and for speeds of 40 Gbps and above because silicon optical waveguide propagation delay $\tau_{optical}$ of the optical signals in the arms of the TWE MZM is about 11.4 picoseconds (ps)/mm. In comparison, propagation delay $\tau_0$ of an unloaded TWE may be about 6.4 ps/mm. To achieve maximum electro-optical bandwidth, velocities of an electrical driving signal through each TWE and the optical signals in the arms of the TWE MZM may be matched. By periodically loading transmission line electrodes (e.g., TWEs 210) of impedance $Z_0$ and propagation delay $\tau_0$ with carrier depletion reverse biased PN diodes (e.g., as the optical phase shifters 218 in FIGS. 2A and 2B), loaded transmission line characteristics of impedance ($Z_{loaded}$) and propagation delay ($\tau_{loaded}$) of the transmission line electrodes may be altered according to equations 2 and 3:

$$Z_0 = \sqrt{\frac{L_0}{C_0}}, \tau_0 = \sqrt{L_0, C_0} \qquad (2)$$

$$Z_{loaded} = \sqrt{\frac{L_0}{C_0 + C_{load}}}, \tau_{loaded} = \sqrt{L_0, (C_0 + C_{load})} \qquad (3)$$

In equations 2 and 3, $L_0$ is inductance and $C_0$ is capacitance of the unloaded transmission line electrodes per unit length. In equations 3, $C_{load}$ is the capacitance per unit length of the load used to load the transmission line electrodes, e.g., $C_{load}$ may be the capacitance per unit length of the carrier depletion reverse biased PN diodes or other optical phase shifters 218.

In some embodiments, modulator capacitance is approximately 220 femtofarads (fF)/mm at 2 V reverse bias with a series resistance of ~10 Ω·mm. For RF electrical and optical waves velocity matching, the unloaded TWE electrodes may have an impedance $Z_0$ of 35Ω while the loaded TWE electrodes may have an impedance $Z_{loaded}$ of 20Ω for a differential driver configuration as illustrated in FIGS. 2A and 2B.

Figure 3:
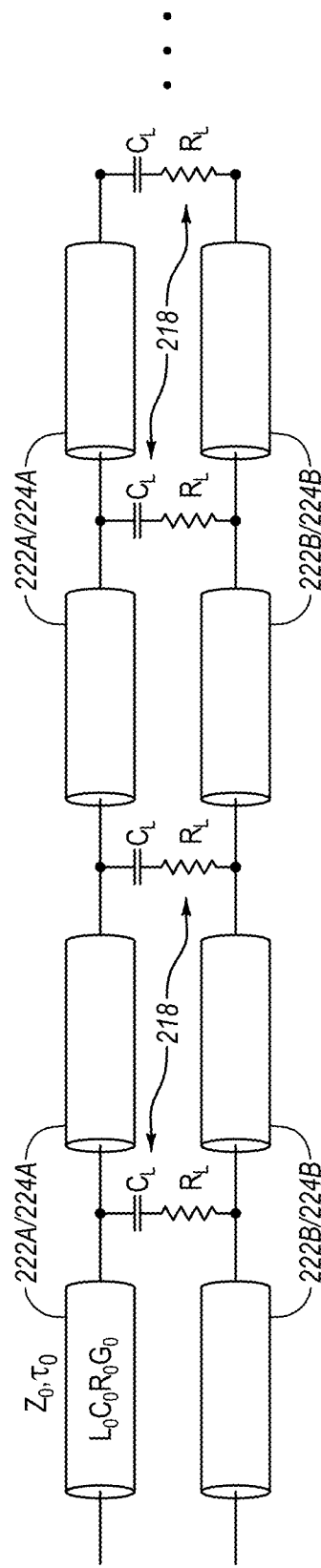
FIG. 3 illustrates a portion of one TWE of FIGS. 2A and 2B.

FIG. 3 illustrates a portion of one of the TWE 210 of FIGS. 2A and 2B, arranged in accordance with at least one embodiment described herein. In particular, FIG. 3 includes first transmission line segments 222A or 224A and second transmission line segments 222B or 224B of the first arm TWE 210A or the second arm TWE 210B of FIGS. 2A and 2B. FIG. 3 additionally includes optical phase shifters 218, each modeled as a capacitance $C_L$ and a resistance $R_L$. $C_L$ is equal to 2*$C_{load}$. In FIG. 3, the transmission line 222 or 224 made of first and second transmission line segments 222A and 222B or 224A and 224B may be described by parameters $Z_0$, $\tau_0$, $L_0$, $C_0$, $R_0$, and $G_0$ indicated in FIG. 3, where $Z_0$, $\tau_0$, $L_0$, and $C_0$, have been defined previously, $R_0$ is transmission line loss and skin effect loss, and $G_0$ is conductance of the TWE dielectric material.

Taking $R_0$ and $R_L$ into account, a complex propagation parameter $\gamma_{RF} = \alpha_{RF} + j\beta_{RF}$ of the loaded TWE 210 can be expressed according to equations 4.

$$\gamma_{RF} = \sqrt{(R_0 + j\omega L_0) \cdot (G_T + j\omega(C_0 + C_T))} \qquad (4)$$

$$\text{with } C_T = \frac{2C_L}{1 + R_L^2 C_L^2 \omega^2}, \frac{1}{G_T} = \frac{R_L}{2}\left(1 + \frac{1}{R_L^2 C_L^2 \omega^2}\right)$$

In equations 4, j is an imaginary number, w is modulation frequency, $G_T$ is calculated equivalent dielectric loss caused by the load, and the other elements of equations 4 are as defined above.

From the foregoing, it can be determined that skin effect loss dominates below modulation frequency ω of 20 gigahertz (GHz) and modulator loss dominates above modulation frequency ω of 20 GHz. The exact value of the modulation frequency ω may be higher or lower than 20 GHz depending on what structure and materials are used. Total RF loss (e.g., skin effect loss plus modulator loss) at a modulation frequency co of 28 GHz using the parameters described herein may be about 4 dB/mm. For a TWE MZM with TWEs having a length of, say, 5 mm, the loss of 4 dB/mm across 5 mm may be unacceptably high. Both modulator access resistance and skin loss may have to be minimized to achieve large bandwidth, such as 40 Gbps or higher. Unfortunately, these parameters are, for the most part, set by the technology and on chip transmission lines. Transmitter equalization may be provided by the differential TWE MZM driver 202.

A total amount of phase shift at an end of the two TWEs 210 may be the cumulative phase shift of all the optical phase shifter sections along the two TWEs 210 and may be calculated by integrating voltage drive along the TWEs 210. We find that MZM insertion loss caused by RF losses at a given frequency may be determined according to equation 5.

$$\frac{(1 - e^{-\alpha_{RF}(f)L})}{\alpha_{RF}(f)L} \qquad (5)$$

In equation 5, f is modulation frequency (where ω=2πf) and the other elements of equation 5 are as defined above.

Figure 4:
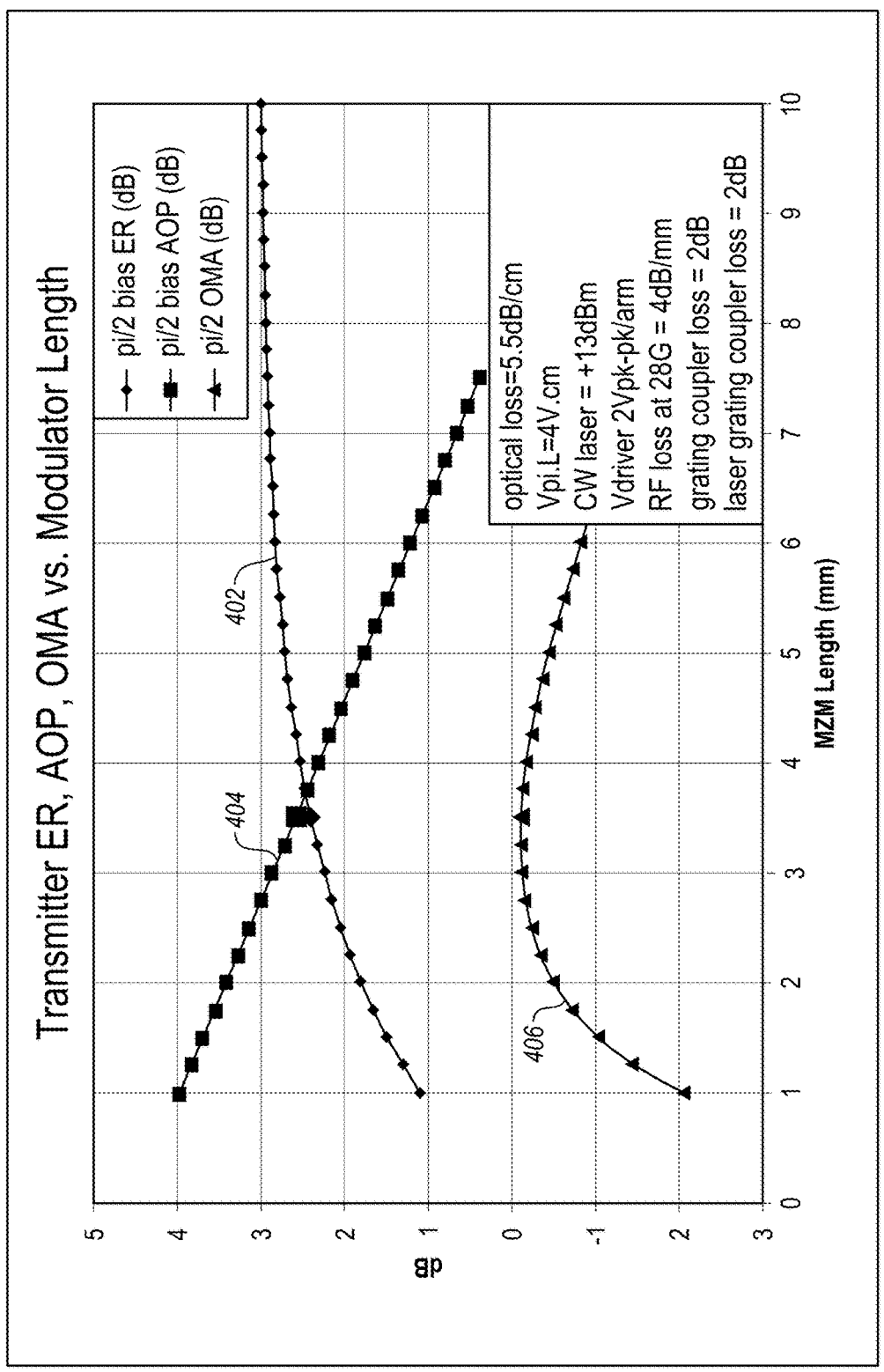
FIG. 4 is a graphical representation of extinction ratio (ER), average optical power (AOP), and optical modulation amplitude (OMA), all as a function of TWE length at $\pi/2$ bias.

At high frequencies, as TWE losses caused by skin effect loss and the modulator access resistance become significant, increasing the length of the modulator no longer produces additional phase shift and the efficiency of the modulator does not improve. Taking this into account, for $\alpha_{RF}$(28 GHz)=4 dB/mm, maximum OMA achieved at π/2 bias on the MZM transfer curve is achieved with a TWE length of about 3.5 mm, as shown in FIG. 4. In more detail, FIG. 4 is a graphical representation of extinction ratio (ER) 402, average optical power (AOP) 404, and OMA 406, all as a function of TWE length at π/2 bias, arranged in accordance with at least one embodiment described herein. As illustrated in FIG. 4, the OMA 406 peaks at around 3.5 mm.

Consistent with the foregoing, and as already indicated above, each of the TWEs 210 of FIGS. 2A and 2B may in some embodiments have a length of 3.36 mm and may be composed of twelve optical phase shifter sections, each having a length of about 280 micrometers (μm). The transmission lines 222 and 224 may include 6u metal4 over metal1 microstrips. The differential TWE MZM driver 202 may provide 2 V reverse bias and may deliver 2 V peak to peak per arm (pk-pk/arm). In other embodiments, the TWEs may be longer or shorter than 3.36 mm and may be composed of more or fewer than twelve optical phase shifter sections. Alternately or additionally, in some embodiments, the transmission lines 222 and 224 and the differential TWE MZM driver 202 may be configured differently than in the foregoing example.

Figure 5:
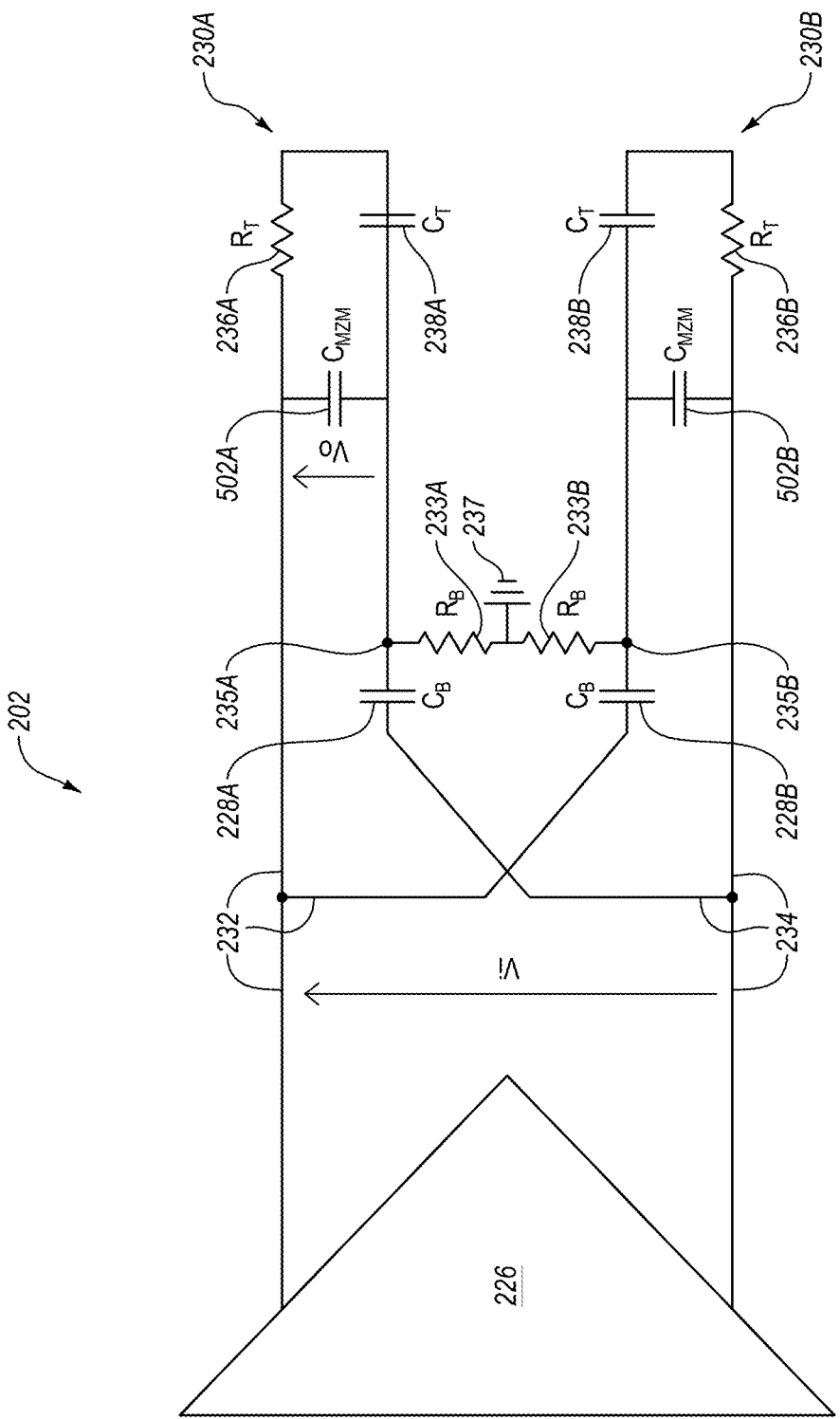
FIG. 5 is a circuit diagram of the TWE MZM of FIGS. 2A and 2B.

FIG. 5 is a circuit diagram of the TWE MZM 200 of FIGS. 2A and 2B, arranged in accordance with at least one embodiment described herein. In FIG. 5, a low frequency small signal is assumed such that the loaded TWEs 210 may be represented as capacitors 502A and 502B, each with a capacitance of $C_{MZM}$. The voltages $V_0$ and $V_i$ denoted in FIG. 5 may have the relationship indicated by Equation 6.

$$\frac{V_0}{V_i} = \frac{1}{2} \cdot \frac{(1 + 2R_B C_B s) \cdot (1 + R_T C_T s)}{1 + (R_T C_T + R_B C_T + R_B (C_{MZM} + C_B))s + R_B(C_{MZM} + C_B)R_T C_T s^2} \qquad (6)$$

In equation 6, s is the complex number frequency and all other elements of equation 6 are as defined elsewhere herein. It is assumed that the resistance $R_B$ of each of the first and second bias c, resistors 233A and 233B is much larger than the resistance $R_T$ of each of the first and second H termination resistors 236A.

Equation 6 may be simplified to equation 7 by choosing $C_B = C_{MZM} + C_T$.

$$\frac{V_0}{V_i} = \frac{1}{2} \cdot \frac{1 + R_T C_T s}{1 + \frac{C_{MZM} + C_B}{2 C_B} R_T C_T s} \quad (7)$$

All elements of equation 7 are as defined elsewhere herein. Equation 7 is essentially a ratio or combination of a high pass function and a low pass function. It provides a de-emphasis of low frequency to equalize loss. In some embodiments in the TWE MZMs 200, 200B described herein, the capacitances $C_B$, $C_{MZM}$, and $C_T$ are selected such that $C_B = C_{MZM} + C_T$ to de-emphasize low frequency and equalize loss.

Embodiments of the TWE MZMs described herein include a differential driver. Other TWE MZMs implement a single-ended driver and terminate transmission lines by DC coupling. In some of these other TWE MZMs, the driver is AC coupled to a cathode of an optical phase shifter, bias is provided with a bias T to the cathode, an anode of the optical phase shifter is grounded, and a termination resistor is either grounded or connected to direct current bias. In such TWE MZMs, the TWEs may be optimized to reduce loss without otherwise compensating loss. Further, the transmission line has to be terminated accurately (e.g., impedance matched) to eliminate back reflections. According to embodiments described herein, however the TWEs 210 are lossy which attenuates the modulation signal along the length of the TWEs 210. Even if the transmission lines 222, 224 of the TWEs 210 are not terminated accurately, the modulation signal is sufficiently attenuated that reflections may not be a significant source of interference and there may be a relatively well-behaved eye diagram.

FIGS. 6A and 6B illustrate the TWE MZM 200B of FIG. 2B and various simulated eye diagrams at locations indicated by arrows that extend from each of the eye diagrams, arranged in accordance with at least one embodiment described herein. In both FIGS. 6A and 6B, the eye diagrams are for a 56 Gbps signal. The TWE MZM 200B of FIG. 6A includes first and second capacitors 228A and 228B each with a capacitance $C_B$ of 1 microfarad (μF). In FIG. 6A, each of the first and second termination capacitors 238A and 238B similarly each have a capacitance $C_T$ of 1 μF. Such high capacitances for the first and second capacitors 228 and 228B and the first and second termination capacitors 238A and 238B is consistent with capacitance values for capacitors used in some existing TWE MZMs. In comparison, in FIG. 6B, each of the first and second capacitors 228A and 228B have a capacitance $C_B$ of 2.5 pF and each of the first and second termination capacitors 238A and 238B have a capacitance $C_T$ of 1.5 pF. The other parameters of the TWE MZM 200B of FIGS. 6A and 6B may include the values described elsewhere herein. It can be seen from FIGS. 6A and 6B that an eye diagram 602 at an output of the TWE MZM 200B of FIG. 6B is much cleaner and more open than an eye diagram 604 at an output of the TWE MZM 200B of FIG. 6A. It can be seen from FIGS. 6A and 6B that much smaller capacitance values in FIG. 6B significantly improve the eye diagram 602 of FIG. 6B compared to the eye diagram 604 of FIG. 6A. In addition, capacitors with the capacitance values of FIG. 6B can easily be integrated on-chip with the PIC or the differential driver 226 of the TWE MZM 200B, whereas capacitors with the capacitance values of FIG. 6A could not be integrated on-chip.

Figure 7:
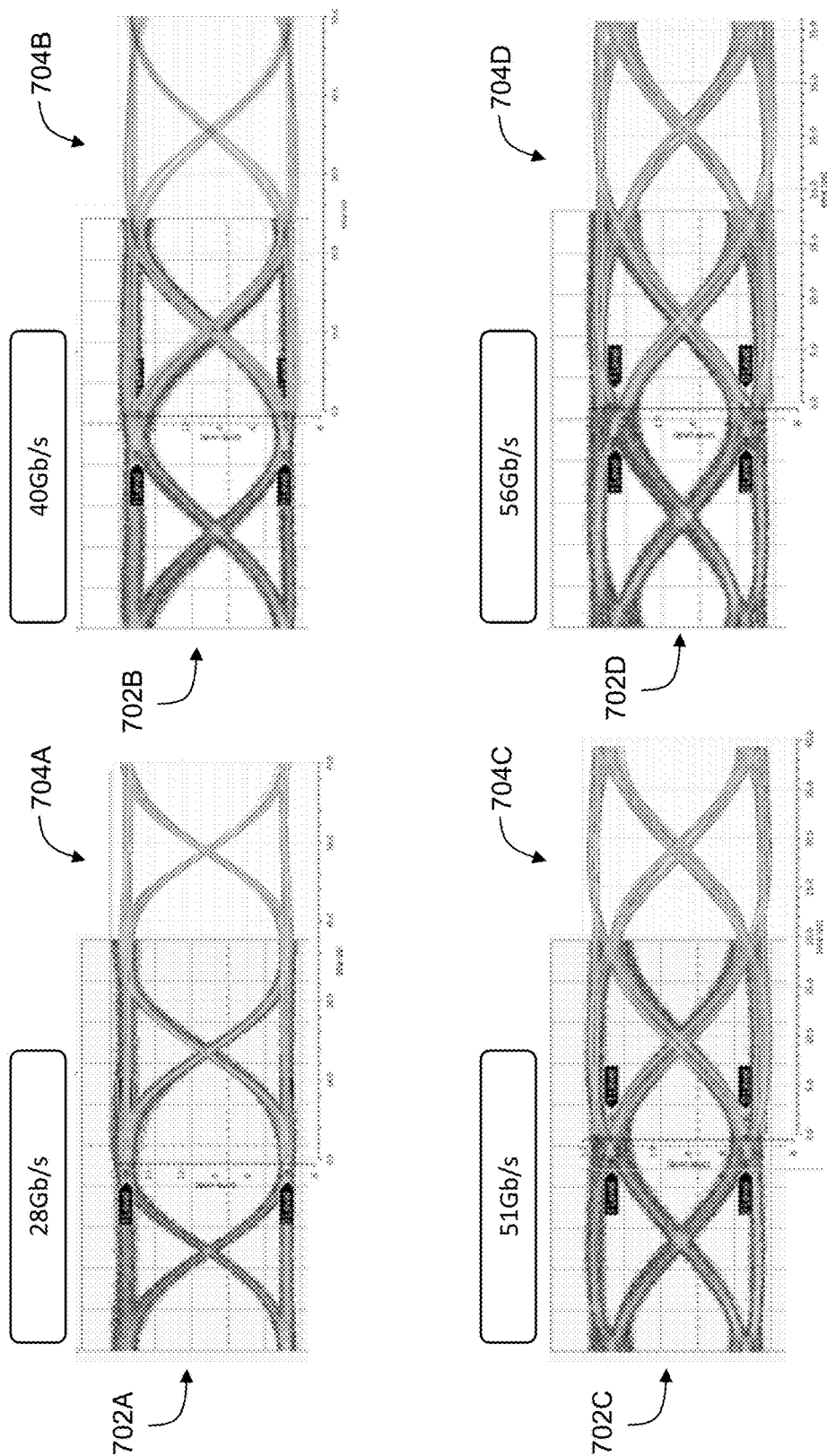
FIG. 7 illustrates measured eye diagrams in a lab at an output of the TWE MZM of FIG. 2B for four different modulation speeds, as well as corresponding simulated eye diagrams, all arranged in accordance with at least one embodiment described herein.

FIG. 7 illustrates measured eye diagrams 702A-702B in a lab at an output of the TWE MZM 200B for four different modulation speeds, as well as corresponding simulated eye diagrams 704A-704B, arranged in accordance with at least one embodiment described herein. The TWE MZM 200B used in the measurements of FIG. 7 has the following parameters: $C_B$ of 2.5 pF, $R_B$ of 5 kΩ, $R_T$ of 40Ω, $C_T$ of 1.5 pF, TWE 210 length of 3.36 mm, each TWE 210 composed of twelve optical phase shifter sections with a length of about 280 μm per optical phase shifter section. Each of the optical phase shifter sections includes a carrier depletion reverse biased PN diode. The transmission lines 222 and 224 include 6u metal4 over metal1 microstrips. The differential TWE MZM driver 202 provides 2 V reverse bias and delivers 2 V pk-pk/arm.

The measured eye diagram 702A and the simulated eye diagram 704A are for a modulation speed of 28 Gbps. The measured eye diagram 702B and the simulated eye diagram 704B are for a modulation speed of 40 Gbps. The measured eye diagram 702C and the simulated eye diagram 704C are for a modulation speed of 51 Gbps. The measured eye diagram 702D and the simulated eye diagram 704D are for a modulation speed of 56 Gbps.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A differential traveling wave electrode (TWE) Mach-Zehnder-Modulator (MZM) driver, comprising:
    a differential driver with a first differential output and a second differential output that collectively form a differential pair, wherein:
        the first differential output is DC coupled to a first arm optical phase shifter of a first arm TWE of a TWE MZM;
        the second differential output is DC coupled to a second arm optical phase shifter of a second arm TWE of the TWE MZM, wherein each of the first and second arm TWEs comprises a lossy TWE configured to attenuate a modulation signal;
    a first capacitor that AC couples the second differential output to the first arm optical phase shifter;
    a second capacitor that AC couples the first differential output to the second arm optical phase shifter;
    a first termination coupled to the first arm optical phase shifter; and
    a second termination coupled to the second arm optical phase shifter.

2. The differential TWE MZM driver of claim 1, further comprising:
    a first bias resistor coupled to a first node, wherein the first node is coupled between the first capacitor and the first arm optical phase shifter; and
    a second bias resistor coupled to a second node, wherein the second node is coupled between the second capacitor and the second arm optical phase shifter.

3. The differential TWE MZM driver of claim 2, wherein:
    the first termination comprises a first termination resistor and a first termination capacitor, the first termination resistor coupled to a cathode of the first arm optical phase shifter and the first termination capacitor coupled between the first termination resistor and an anode of the first arm optical phase shifter; and the second termination comprises a second termination resistor and a second termination capacitor, the second termination resistor coupled to a cathode of the second arm optical phase shifter and the second termination capacitor coupled between the second termination resistor and an anode of the second arm optical phase shifter.

4. The differential TWE MZM driver of claim 3, wherein each of the first capacitor and the second capacitor has a capacitance of 2.5 picofarads (pF).

5. The differential TWE MZM driver of claim 3, wherein each of the first bias resistor and the second bias resistor has a resistance of 5 kiloOhms (kΩ).

6. The differential TWE MZM driver of claim 3, wherein each of the first termination resistor and the second termination resistor has a resistance of 40 ohms (Ω).

7. The differential TWE MZM driver of claim 3, wherein each of the first termination capacitor and the second termination capacitor has a capacitance of 1.5 pF.

8. The differential TWE MZM driver of claim 3, wherein the first capacitor, the second capacitor, the first termination resistor, the second termination resistor, the first termination capacitor, and the second termination capacitor are integrated on chip with the differential driver.

9. The differential TWE MZM driver of claim 1, wherein:
the first arm optical phase shifter includes a cathode and an anode;
the second arm optical phase shifter includes a cathode and an anode;
the first differential output is DC coupled to the cathode of the first arm optical phase shifter;
the second differential output is DC coupled to the cathode of the second arm optical phase shifter;
the first capacitor AC couples the second differential output to the anode of the first arm optical phase shifter;
the second capacitor AC couples the first differential output to the anode of the second arm optical phase shifter;
the first termination is coupled to the cathode and the anode of the first arm optical phase shifter; and
the second termination is coupled to the cathode and the anode of the second arm optical phase shifter.

10. The differential TWE MZM driver of claim 9, wherein:
the first arm optical phase shifter comprises a first plurality of carrier depletion reverse biased PN diodes;
the second arm optical phase shifter comprises a second plurality of carrier depletion reverse biased PN diodes;
the TWE MZM includes a first arm TWE coupled to the first plurality of carrier depletion reverse biased PN diodes and a second arm TWE coupled to the second plurality of carrier depletion reverse biased PN diodes;
the first arm TWE includes a first plurality of transmission line segments electrically coupled in series to form a first conductor of a first two-conductor transmission line and a second plurality of transmission line segments electrically coupled in series to form a second conductor of the first two-conductor transmission line;
the first plurality of carrier depletion reverse biased PN diodes are coupled in parallel between the first and second conductors of the first two-conductor transmission line to form a first plurality of optical phase shifter sections;
each of the first plurality of optical phase shifter sections includes a corresponding one of the first plurality of transmission line segments, a corresponding one of the second plurality of transmission line segments, and a corresponding one of the first plurality of carrier depletion reverse biased PN diodes with its cathode coupled to the corresponding one of the first plurality of transmission line segments and its anode coupled to the corresponding one of the second plurality of transmission line segments;
the second arm TWE includes a third plurality of transmission line segments electrically coupled in series to form a first conductor of a second two-conductor transmission line and a fourth plurality of transmission line segments electrically coupled in series to form a second conductor of the second two-conductor transmission line;
the second plurality of carrier depletion reverse biased PN diodes are coupled in parallel between the first and second conductors of the second two-conductor transmission line to form a second plurality of optical phase shifter sections;
each of the second plurality of optical phase shifter sections includes a corresponding one of the third plurality of transmission line segments, a corresponding one of the fourth plurality of transmission line segments, and a corresponding one of the second plurality of carrier depletion reverse biased PN diodes with its cathode coupled to the corresponding one of the third plurality of transmission line segments and its anode coupled to the corresponding one of the fourth plurality of transmission line segments;
the first differential output is DC coupled to the cathode of the first arm optical phase shifter by being DC coupled to the cathode of each of the first plurality of carrier depletion reverse biased PN diodes through one or more of the first plurality of transmission line segments;
the second differential output is DC coupled to the cathode of the second arm optical phase shifter by being DC coupled to the cathode of each of the second plurality of carrier depletion reverse biased PN diodes through one or more of the third plurality of transmission line segments;
the second differential output is AC coupled to the anode of the first arm optical phase shifter by being AC coupled to the anode of each of the first plurality of carrier depletion reverse biased PN diodes through the first capacitor and one or more of the second plurality of transmission line segments; and
the first differential output is AC coupled to the anode of the second arm optical phase shifter by being AC coupled to the anode of each of the second plurality of carrier depletion reverse biased PN diodes through the second capacitor and one or more of the fourth plurality of transmission line segments.

11. A traveling wave electrode (TWE) Mach-Zehnder-Modulator (MZM), comprising:
an input waveguide coupled to a continuous wave (CW) laser to receive a CW input beam;
a first arm optical waveguide coupled to receive a first portion of the CW input beam from the input waveguide;
a second arm optical waveguide coupled to receive a second portion of the CW input beam from the input waveguide;
an optical beam splitter coupled to an output of the input waveguide and to inputs of the first arm optical waveguide and the second arm optical waveguide, wherein the optical beam splitter is configured to split the CW input beam into the first portion of the CW input beam and the second portion of the CW input beam;
a first arm optical phase shifter coupled to the first arm optical waveguide;
a second arm optical phase shifter coupled to the second arm optical waveguide;
a differential TWE MZM driver coupled to the first and second arm optical phase shifters, wherein the differential TWE MZM driver includes:
a differential driver with a first differential output and a second differential output that collectively form a differential pair, wherein:
the first differential output is DC coupled to the first arm optical phase shifter;
the second differential output is DC coupled to the second arm optical phase shifter;
a first capacitor that AC couples the second differential output to the first arm optical phase shifter;
a second capacitor that AC couples the first differential output to the second arm optical phase shifter;
a first termination coupled to the first arm optical phase shifter; and
a second termination coupled to the second arm optical phase shifter.

12. The TWE MZM of claim 11, further comprising:
a first bias resistor coupled to a first node, wherein the first node is coupled between the first capacitor and the first arm optical phase shifter; and
a second bias resistor coupled to a second node, wherein the second node is coupled between the second capacitor and the second arm optical phase shifter.

13. The TWE MZM of claim 12, wherein:
the first termination comprises a first termination resistor and a first termination capacitor, the first termination resistor coupled to a cathode of the first arm optical phase shifter and the first termination capacitor coupled between the first termination resistor and an anode of the first arm optical phase shifter; and
the second termination comprises a second termination resistor and a second termination capacitor, the second termination resistor coupled to a cathode of the second arm optical phase shifter and the second termination capacitor coupled between the second termination resistor and an anode of the second arm optical phase shifter.

14. The TWE MZM of claim 13, wherein:
each of the first capacitor and the second capacitor has a capacitance of 2.5 picofarads (pF);
each of the first bias resistor and the second bias resistor has a resistance of 5 kiloOhms (kΩ);
each of the first termination resistor and the second termination resistor has a resistance of 40 ohms (Ω); and
each of the first termination capacitor and the second termination capacitor has a capacitance of 1.5 pF.

15. The TWE MZM of claim 13, wherein the first capacitor, the second capacitor, the first termination resistor, the second termination resistor, the first termination capacitor, and the second termination capacitor are integrated on chip with the differential driver.

16. The TWE MZM of claim 11, wherein:
the first arm optical phase shifter includes a cathode and an anode;
the second arm optical phase shifter includes a cathode and an anode;
the first differential output is DC coupled to the cathode of the first arm optical phase shifter;
the second differential output is DC coupled to the cathode of the second arm optical phase shifter;
the first capacitor AC couples the second differential output to the anode of the first arm optical phase shifter;
the second capacitor AC couples the first differential output to the anode of the second arm optical phase shifter;
the first termination is coupled to the cathode and the anode of the first arm optical phase shifter; and
the second termination is coupled to the cathode and the anode of the second arm optical phase shifter.

17. The TWE MZM of claim 16, further comprising a first arm TWE coupled to a first plurality of carrier depletion reverse biased PN diodes of the first arm optical phase shifter and a second arm TWE coupled to a second plurality of carrier depletion reverse biased PN diodes of the second arm optical phase shifter, wherein:
the first arm TWE includes a first plurality of transmission line segments electrically coupled in series to form a first conductor of a first two-conductor transmission line and a second plurality of transmission line segments electrically coupled in series to form a second conductor of the first two-conductor transmission line;
the first plurality of carrier depletion reverse biased PN diodes are coupled in parallel between the first and second conductors of the first two-conductor transmission line to form a first plurality of optical phase shifter sections;
each of the first plurality of optical phase shifter sections includes a corresponding one of the first plurality of transmission line segments, a corresponding one of the second plurality of transmission line segments, and a corresponding one of the first plurality of carrier depletion reverse biased PN diodes with its cathode coupled to the corresponding one of the first plurality of transmission line segments and its anode coupled to the corresponding one of the second plurality of transmission line segments;
the second arm TWE includes a third plurality of transmission line segments electrically coupled in series to form a first conductor of a second two-conductor transmission line and a fourth plurality of transmission line segments electrically coupled in series to form a second conductor of the second two-conductor transmission line;
the second plurality of carrier depletion reverse biased PN diodes are coupled in parallel between the first and second conductors of the second two-conductor transmission line to form a second plurality of optical phase shifter sections;
each of the second plurality of optical phase shifter sections includes a corresponding one of the third plurality of transmission line segments, a corresponding one of the fourth plurality of transmission line segments, and a corresponding one of the second plurality of carrier depletion reverse biased PN diodes with its cathode coupled to the corresponding one of the third plurality of transmission line segments and its anode coupled to the corresponding one of the fourth plurality of transmission line segments;
the first differential output is DC coupled to the cathode of the first arm optical phase shifter by being DC coupled to the cathode of each of the first plurality of carrier depletion reverse biased PN diodes through one or more of the first plurality of transmission line segments;

the second differential output is DC coupled to the cathode of the second arm optical phase shifter by being DC coupled to the cathode of each of the second plurality of carrier depletion reverse biased PN diodes through one or more of the third plurality of transmission line segments;

the second differential output is AC coupled to the anode of the first arm optical phase shifter by being AC coupled to the anode of each of the first plurality of carrier depletion reverse biased PN diodes through the first capacitor and one or more of the second plurality of transmission line segments; and the first differential output is AC coupled to the anode of the second arm optical phase shifter by being AC coupled to the anode of each of the second plurality of carrier depletion reverse biased PN diodes through the second capacitor and one or more of the fourth plurality of transmission line segments.

18. The TWE MZM of claim 17, wherein:

a number of the first plurality of optical phase shifter sections comprise twelve;

a number of the second plurality of optical phase shifter sections comprise twelve; and a length of each of the first optical phase shifter and the second optical phase shifter is 3.36 millimeters (mm).

19. The TWE MZM of claim 11, further comprising:

a first arm static quadrature phase biasing phase shifter coupled to the first arm optical waveguide after the first arm optical phase shifter;

a second arm static quadrature phase biasing phase shifter coupled to the second arm optical waveguide after the second arm optical phase shifter;

wherein the first and second arm static quadrature phase biasing phase shifters are collectively configured to bias outputs of the first and second arm optical waveguides at a $\pi/2$ phase shift relative to each other.

20. The TWE MZM of claim 11, further comprising a first spot size converter configured to couple a CW input beam emitted by the CW laser into the input waveguide and a second spot size converter configured to couple an output of the TWE MZM into an output optical fiber.

* * * * *